(12) United States Patent
Hugues

(10) Patent No.: US 6,892,988 B2
(45) Date of Patent: May 17, 2005

(54) CYLINDRICAL WING TIP WITH HELICAL SLOT

(76) Inventor: Christian Hugues, 81, Voie des Blondeaux, Vitry sur Seine (FR), F-94400

( * ) Notice: Subject to any disclaimer, the term of this patent is extended or adjusted under 35 U.S.C. 154(b) by 0 days.

(21) Appl. No.: 10/474,879

(22) PCT Filed: Apr. 9, 2002

(86) PCT No.: PCT/FR02/01232

§ 371 (c)(1),
(2), (4) Date: Apr. 14, 2004

(87) PCT Pub. No.: WO02/083497

PCT Pub. Date: Oct. 24, 2002

(65) Prior Publication Data

US 2004/0195461 A1 Oct. 7, 2004

(30) Foreign Application Priority Data

Apr. 11, 2001 (FR) .......................................... 01 04998

(51) Int. Cl.[7] .............................................. B64D 27/02
(52) U.S. Cl. ...................................................... 244/199
(58) Field of Search ................................ 244/199, 198, 244/35 R, 45 R, 34 R, 91

(56) References Cited

U.S. PATENT DOCUMENTS 2,576,981 A    12/1951  Richard 3,596,854 A  *  8/1971  Haney, Jr. .................... 244/199
3,997,132 A  * 12/1976  Erwin ......................... 244/199
4,477,042 A    10/1984  Griswold
4,533,101 A  *  8/1985  Patterson, Jr. .............. 244/199
5,102,068 A  *  4/1992  Gratzer ...................... 244/35 R
5,297,764 A  *  3/1994  Haney ......................... 244/199
5,332,177 A  *  7/1994  Boyle, Jr. .................. 244/34 A
6,260,809 B1 *  7/2001  Egolf et al. ................. 244/198
6,474,604 B1 * 11/2002  Carlow ....................... 244/199
6,682,021 B1 *  1/2004  Truax et al. ................. 244/201

FOREIGN PATENT DOCUMENTS

FR          2 294 085          7/1976

* cited by examiner

*Primary Examiner*—Tien Dinh
(74) *Attorney, Agent, or Firm*—Young & Thompson

(57) ABSTRACT

A device having the form of a cylindrical spiral cavity and/or incorporating a helicoidal slot, making it possible to reduce induced drag and marginal swirl (vortex) and increase drag/lift ratio. Integrated with the wingtip or articulated on the wingtip, it can be adapted for all airfoils, in particular the wings of airplanes and gliders, helicopter blades and the tips or tractor or pusher airscrews, wind-powered generator blades and for surface vessels or submarines where lift or direction is used in triple axis (vertical, horizontal, and yaw) displacement. Used in a reverse configuration (undersurface/upper surface) on high speed land vehicles or racing cars, this device, when secured to the tip of each wing, produces a result inversely proportional to speed. The faster the vehicle is traveling, the less drag it generates and greater its ground adhesion.

20 Claims, 4 Drawing Sheets

CYLINDRICAL WING TIP WITH HELICAL SLOT

BACKGROUND OF THE INVENTION

1. Field of the Invention

Secured to a wingtip, the invention concerns a device having the shape of a goose feather cut outwards and towards the leading edge, the shank of which represents a cylindrical cavity spiral in form and/or incorporating a helicoidal slot. The device reduces induced drag and marginal swirl (vortex), and increases lift-drag ratio.

Secured to the wingtip, articulated or not, the device can be adapted for all airfoils, in particular the wings of airplanes and gliders, helicopter blades and the tips of tractor and pusher airscrews or the blades of wind-powered generators, and also for surface vessels or submarines, where lift or direction is used in triple-axis (vertical, horizontal and yaw) displacement.

In terms of initial performance, the invention provides for lower power drive systems, increased range and higher speeds, while reducing energy consumption or producing increased energy in the case of wind-powered generators, increasing payloads, and ensuring enhanced safety for airfield or airport transit, incoming and outgoing air traffic.

Used in a reverse configuration (undersurface/upper surface) on high speed land vehicles or racing cars, the device, when secured at the tip of each wing, produces a result inversely proportional to speed. The faster the vehicle is traveling, the lower the it drag generates and the more efficient its ground adhesion.

2. Description of Related Art

Any object moving through air induces drag which is the component parallel to direction of flow. The aim of merely reducing this drag is the constant task of every fluid mechanics engineer. An airplane with zero drag is a purely Utopian concept. To make an airplane fly, it is necessary to adapt a propulsive or tractive force equal to its drag. Several kinds of drag are involved with an airplane. In this particular case we shall consider induced drag.

Always directed parallel to relative wind (12) induced drag is the main causes of swirl on the trailing edge (2): the air passing over the upper surface (5) of a wing tends to flow towards the inside. This is because the pressure on upper surface (5) is lower than the pressure outside the wingtips. The air under the wing flows towards the outside, because the pressure on the undersurface (6) is higher than the pressure outside the wingtips, and the air is constantly trying to circumvent the wingtip from undersurface (5) to upper surface (6). One way perhaps of explaining why a high wing aspect-ratio is better than a low wing aspect-ratio, would be to say that the greater the wing aspect-ratio the lower the proportion of air escaping via the wingtips, and the air circumventing the wingtips is no longer there to induce lift. This phenomenon it is also referred to as "marginal loss".

As these two flows, upper surface (6) flow and undersurface (5) flow, meet on the trailing edges (2) at a certain angle, they form swirls, which, seen from the rear are clockwise behind the left wing and counter-clockwise behind the right wing. All swirls on the same side tend to meet to form one large swirl escaping from each wingtip. These two big swirls are called marginal swirls (10) or more commonly vortexes.

Most pilots have observed the central part of the swirls made visible by the condensation of moisture in the air, corresponding to a pressure drop in the heart of the swirl.

If we now consider the direction of rotation of the swirls, we see that there is an upward air flow outside the wingspan and a downward flow behind the trailing edge. This downward flow should not be confused with the deflection which occurs in the normal way. In this last case, downward deflection is always accompanied by upward flow in front of the wing, so that the final direction of flow is not modified.

But in the case of vortex (10), upward deflection occurs outside and not ahead of the wing, so that the air flow leaving the wing is finally directed downwards, and lift, acting perpendicularly to flow, is consequently inclined slightly backwards and contributes to drag effect.

For a rectangular wing, this drag component is referred to as induced drag and is calculated as follows.

Induced drag=$Cxi(Cz^2/\pi\lambda) \cdot \frac{1}{2}\rho V^2 \cdot S$ (expressed in Newtons)

Cxi=induced drag coefficient
Cz=lift coefficient
$\pi$=3, 14
$\lambda$=wing aspect-ratio (wingspan/wing mean chord.)
or (wingspan$^2$/surface)
$\rho$=air density
V=airspeed in meters/second
S=surface (airfoil or master cross-section)

and is multiplied it by the speed of the aircraft in meters per second. This gives a result expressed in watts, which must be converted to required horsepower for incidence situations such as climb, descent or stabilized flight at cruising speed whether loaded or not.

Inversely proportional to the square of airspeed, while remaining drag is directly proportional, all pilots know the problems attaching to wing incidence, in particular in regard to flight endurance. For this they adapt a precise angle of attack, namely a precise indicated airspeed at any altitude with a minimum load, or they increase indicated airspeed for a higher load.

To achieve optimum performance and minimum induced drag, and increase critical mach number, in the case of a tapered wing with a wing aspect-ratio (wingspan$^2$/surface) of 7 to 8, such as the wing of an Airbus A340 or A380 for example (technical information source: EADS), the aircraft has a wing root of 17.7 m, a wingtip of 3.97 m and a wing taper of 0.224 (wingtip chord/root chord), and thus requires a sweep angle.

As a normal wing generates less induced drag, the compromise acquires another dimension for flying an Airbus wing at speeds close to 900 kph at a given angle of attack for a given flight endurance factor. Even if structure and aerodynamics have been studied for this, the wing taper and sweep increase the Cxi (coefficient of induced drag) by 10 to 20% at the cruising speed angle of attack, and certainly generate induced drag representing 33% of total drag in the case of widebody aircraft.

A number of patents covering inventions designed to reduced this drag have been registered in the world. Many devices are mainly cylindrical which, presumptively, cannot produce major gains in terms of induced drag or vortex in consequence of the law governing fluid flow at a variable speed in tubes of the same diameter. As an aircraft, or other winged vehicle, never travels at the same speed, this creates turbulence inside the tube and generates resonances injurious to its operation and/or generating vortex:

No. FR 405 177 (G. BARBAUDY) dated Sep. 11, 1909
No. U.S. Pat. No. 2,075,817 A (A. W. LOERKE) dated Jun. 4, 1937

No. FR 57 646 E (P. M. LEMOIGNE) dated Mar. 20, 1953
No. U.S. Pat. No. 3,596,854 A (HANEY WILLIAM R JR) dated Mar. 8, 1971
No. DE 31 27 257 A (VER FLUGTECHNISCHE WERKE) dated Jan. 27, 1983.

There are also other systems such as vertical wingtip excrescences, currently used on widebody aircraft to decrease induced drag or delay vortex formation. These include the winglets of R. T. Whicomb (U.S.A. 1985). These have been in service for 15 years with the majority of airlines, and achieve recorded gains of between 3 and 4% of total drag (gross gain) and about 1.2% of induced drag (net gain) on an Airbus A340 for example.

There are also the little wing wingtip stacks devised by Ulrich La Roche (Switzerland 1995) which obtain very positive gains.

Again there are the "spiroids" of Aviation Partners (USA 1997) and the vortex generators of Micro Aerodynamics (U.S.A.) mounted on the wing upper surface behind the leading edge.

Apart from the last mentioned, the others, even if manufactured in new materials, cannot withstand birdstrike on an airplane flying at an approach speed of 150 knots (1 knot= 1.852 kph). This has been proved to be the case with the winglets used on widebody aircraft.

To obtain better results with different concepts, current studies are addressing different types of wing for the future such as lozenge and rhomboidal forms, which connect the main wing to the aft horizontal stabilizer wing, joined and mounted above the fuselage. This represents a very efficient compromise for reducing drag and achieving savings. However in this case, the engines mounted on the undersurface of the wings do not decrease noise levels, an aspect strongly contested in the vicinity of airports.

As world air traffic is increasing by 5% annually, the most viable compromise for the environs of airports is to place the engines on the upper surface of the wings, or aft on top of the fuselage. As for the problem of drag reduction or wingtip vortex, this is still the same.

Several research and test programs were conducted for this purpose in 1999 at the Eiffel wind-tunnel laboratory, on a prototype (French patent N° 98/08472: spiral cylindrical cavity) with a rectilinear or helicoidal slot, to confirm the reduction of induced drag and the elimination of vortex. This prototype was mounted on an actual size wingtip with an aspect-ratio of 1.30 (Test report No. Ae-99-127). The same year these results were submitted to and approved by ONERA, which then suggested testing with a new wing with an aspect-ratio of 8, closer to the widebody aircraft such as the future A380 (wing aspect-ratio 7.5).

P.C.T FR/99/01603 (controlled flow pressure equalizer) was registered on Feb. 7, 1999. A wing model with a 1.32 m span and wing aspect-ratio of 8 was built, to mount prototypes (1/7.055 scale) on the wingtips and to test them in a wind tunnel. The work was spread over 4 test campaigns, and 22 pairs of substantially different prototypes were tested. It was found that the Cz value increased on all prototypes equipped with a small tongue (28) with no helicoidal slot. Gains of between 2.8 and 3.2% were obtained on No. 18, 3.2 and 3.6% on No. 19 and 3.6 and 4% on No. 20, with lift also increasing at the same time as lift-drag ratio. No. 22 was equipped with a helicoidal slot, and eliminated vortex at all angles of flight (Test report N° Ae-00-151).

This is a reason for stating that this rectilinear slot (27), as mentioned in PCT FR/99/01603, operates on a low wing aspect-ratio with a low undersurface overpressure air flow. We can say that this initially rectilinear slot changes to a helicoidal slot, and that its pitch or helix angle (29) increases as relative wind speed is high in relation to wing aspect-ratio and wing taper/wing sweep, and also that bevel inlet (15) positions towards the exterior and forms a small tongue from the leading edge, becoming ovoid as viewed from the side.

Described in detail in the French patent and the PCT, this cylindrical wingtip could also be largely cylindrical for pressure- and temperature-related reasons in support of studies under normal conditions. When the slot is helicoidal or largely helicoidal, the helix pitch (29) and the acceleration of centripetal force or induced flow from the undersurface (26) depend on pressure in regard to relative wind speed (16) in proportion to incidence, mass and master cross-section.

Due to the speed of movement of the wing, this overpressure flow from the undersurface (11) tends towards the wingtips (25) and upwards towards the negative pressure upper surface (10), and is immediately converted to a centripetal helicoidal movement towards trailing edge (2). Consequently, if this movement is centripetal towards the trailing edge it must transit via the helicoidal slot created for this purpose round the pseudocylinder, wherever the slot is located and irrespective of its depth.

In the case of aircraft for example, where each device is secured at the tip of each wing, two flows meet on the trailing edge at a certain angle and form swirls. These rotate clockwise, as seen from the rear behind the left wing, and counter-clockwise behind the right wing. This means that each device must be constructed as the opposite of the other applying high-tech methodology.

CAD techniques make it possible to achieve immediate fast prototyping of opposite devices, at the selected scale, and to adapt and secure them to the wingtips for wind tunnel testing. To be correctly configured and approach actual conditions, the wind tunnel is equipped with an isothermal compressor of about 25 atmospheres, in order to determine the flow generated by undersurface overpressure and the angle and width of the helicoidal slot in the device, and establish the optimum Cx value and minimum K factor (K=parasitic drag identified after wind tunnel testing) in regard to maximum cruising speed, or the cruise data (lift, drag and vortex) used.

According to the pressure applied at the ovoid inlet after the small tongue, this helicoidal slot (4), with thickness (x) can rotate through −180° to 360° at an angle (4) α, or one pitch unit, round and to the full depth of the cylindrical cavity, exiting in linear form on the trailing edge (BF).

We already know that the thicker the wing in regard to the depth of the airfoil chord, the greater the lift and resistance it generates. Furthermore, as the angle of attack increases, the effect of the pressure differential between upper surface (10) and undersurface (11) increases also.

It is for this reason that it is important to separate and control the direction of the overpressure induced flow from the undersurface (26) as soon as it forms, just after the leading edge (11), by means of a small tongue (18).

BRIEF SUMMARY OF THE INVENTION

It has been established during tests that the diameter (5) of the cylindrical tip incorporating a helicoidal slot (25) is, to within 10%, the same as the maximum thickness of the wingtip (23), which corresponds to the generated flow and the definition of a wing aspect-ratio (infinite wing aspect-ratio=induced drag and zero vortex).

Generation of lift by the small tongue (18): entrained by relative wind (16), the overpressure induced flow from undersurface (26), commencing just after the leading edge (1) has an immediate tendency to move upwards towards the negative pressure upper surface (10) where it encounters the commencement of the small tongue (18).

The small tongue (18) broadens progressively until it reaches the helicoidal cylindrical inlet where the thickness of the airfoil is maximum (23). The increased overpressure and negative pressure create maximum lift and intensified swirl. Explanations:

BRIEF DESCRIPTION OF THE DRAWINGS

Nomenclature of drawings and diagrams:

1 BA leading edge
2 BF trailing edge
3 a:(angle of helicoid with axis No.9)
4 E: (separation or thickness of helicoidal slot.)
5 D: (diameter No. 25)
6 Airfoil chord
7 Depth of short example (helicoid a: at 140° with axis)
8 Depth of long example (helicoid a: at 140° with axis)
9 Axis (in slide of No.25)
10 Upper surface
11 Undersurface
12 Negative pressure
13 Overpressure
14 Marginal swirl or vortex
15 Ovoid bevel (small tongue and return on undersurface)
16 Relative wind
17 Junction slats
18 Cylindrical tongue
19 Linear ejection
20 Assembly (No.25 and No.22)
21 Wing
22 Wingtip airfoil
23 Maximum thickness of wingtip airfoil
24 Device wingtip attachment
25 Cylindrical wingtip with helicoidal slot
26 Induced undersurface flow
27 Centripetal penetration in helicoidal slot
28 Rigid aerodynamic recess
29 Helicoïd Diagram 1: Front view of cylindrical helicoidal wingtip leading edge and assembly.

Figure 1:
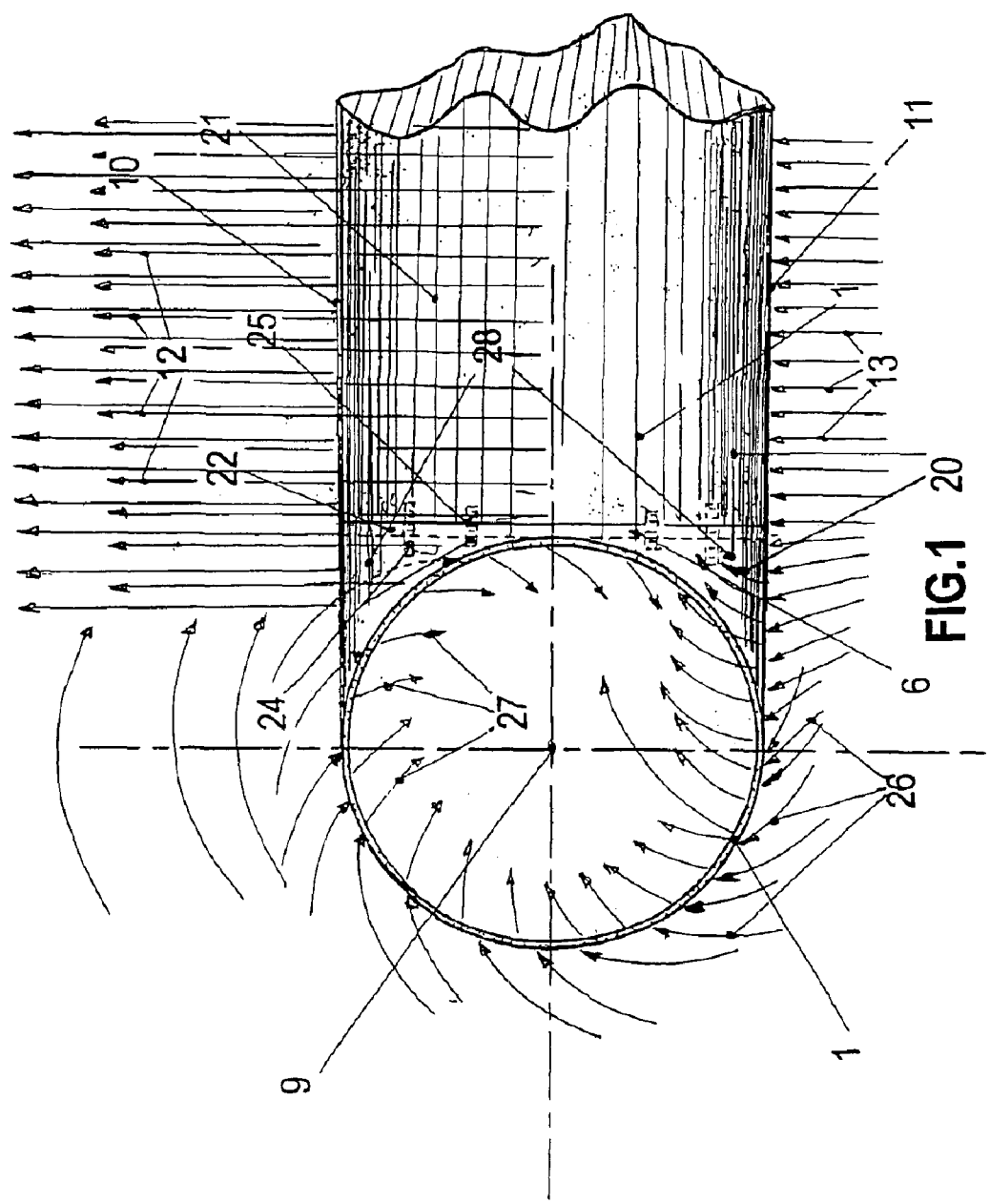
Figure 2:
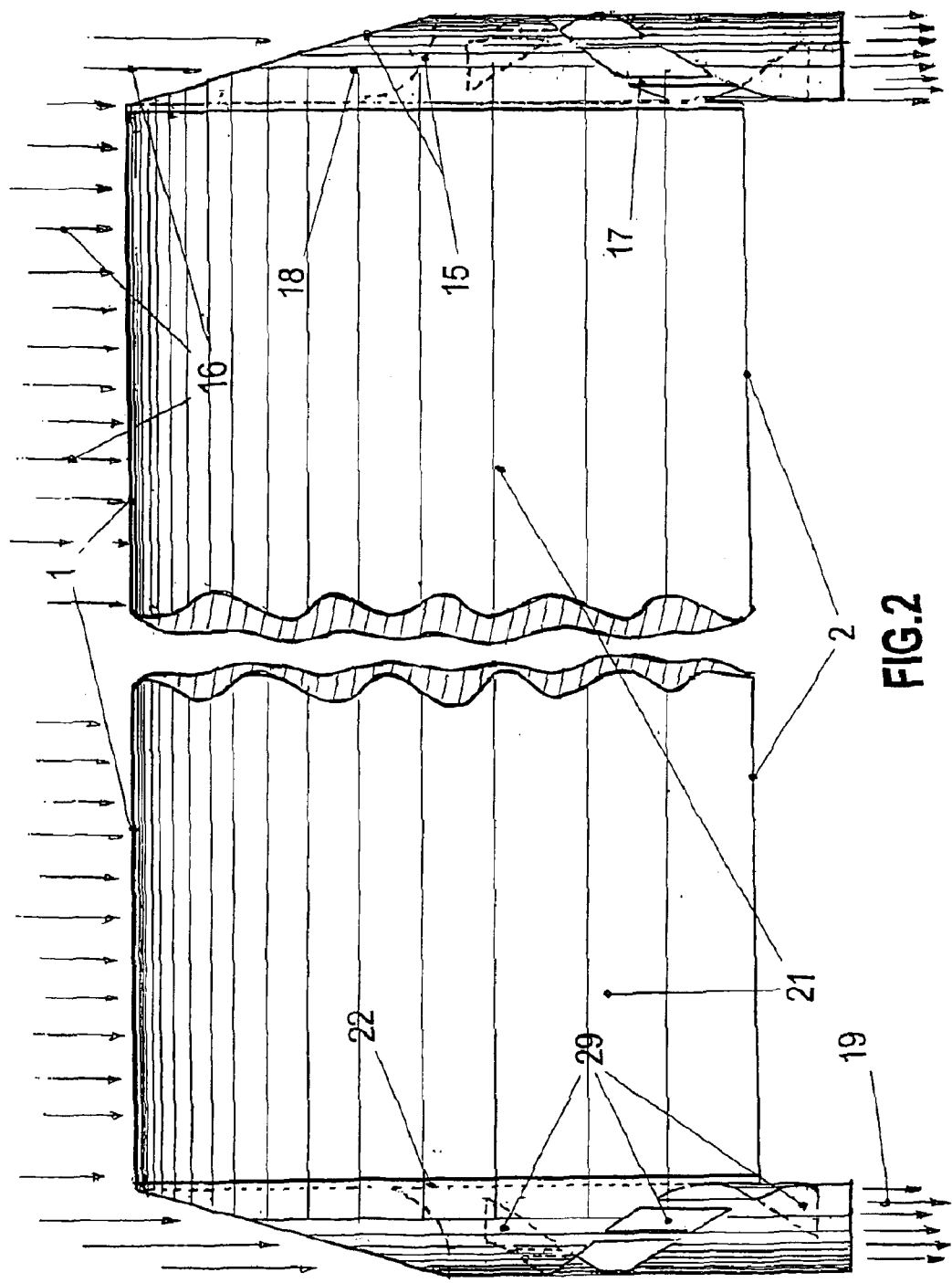
Figure 3:
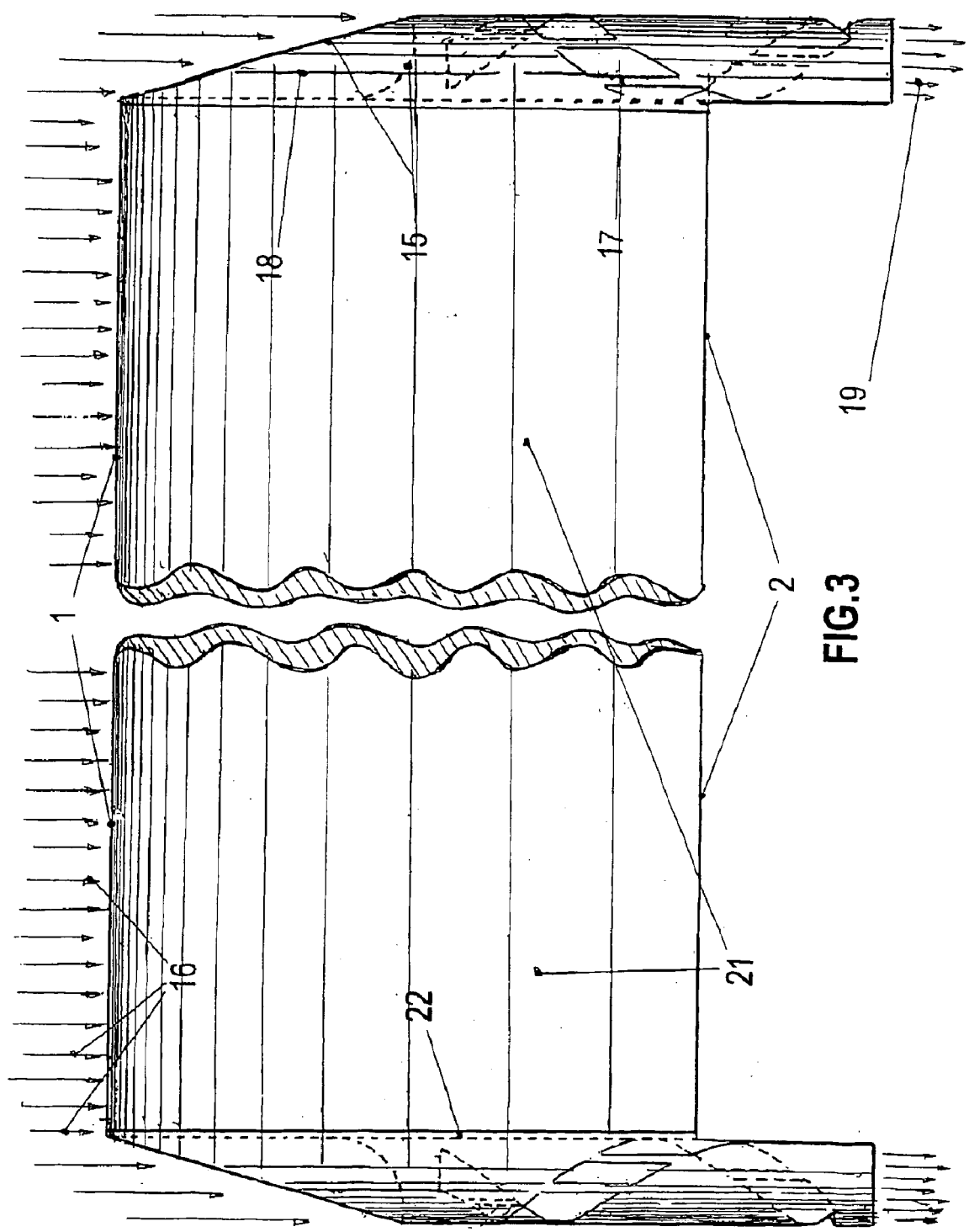
Figure 4:
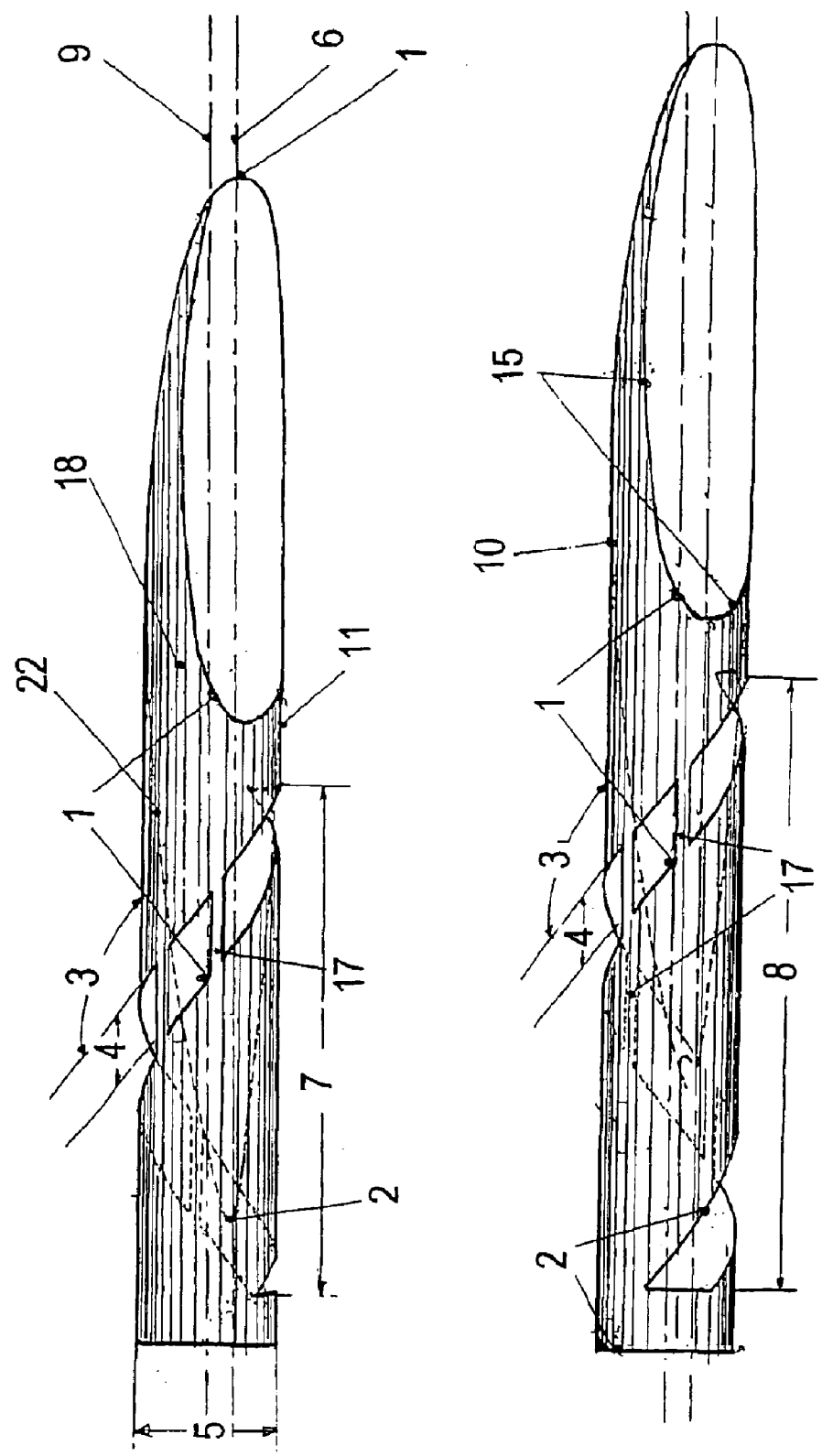

Diagram 2: Plan view of cylindrical wingtip with short helicoid depth and wing.

Diagram 3: Plan view of cylindrical wingtip with long helicoid depth and wing.

Diagram 4: Right side view of cylindrical helicoidal wingtip with short and long helicoid depth

DETAILED DESCRIPTION OF THE INVENTION

Side view of the device secured to the wingtip: forming an integral part as a continuation of the cylinder with its helicoidal slot, and having the same diametrical curvature, the small tongue (18), a kind of semi-circular ovoid in the form of a cut goose feather, follows the shape of the upper surface of the wing towards and up to the leading edge (1). The complete system, whether fixed or mobile, can move parallel to the airfoil chord (6) towards the leading edge (1) or trailing edge (2), and can have a negative or positive setting according to flight data.

Overhead view of the device secured to the wingtip on the upper surface (10): commencing on the upper surface of the leading edge (1), the small tongue (18) broadens following the same curvature as the device, forming a semi-circle integral with the cylindrical inlet with the helicoidal slot.

Front view of the leading edge with the device secured to the wingtip: the small tongue (18) (foreground) with the same diametrical curvature, commences at leading edge (1) and continues, forming a semi-circle (background) which is the cylindrical inlet with the helicoidal slot, with a round, ovoid form (side view).

Attachment of the device to the wingtip: the cylindrical helicoidal inlet/small tongue assembly cannot be secured in a vertical plane as the assembly is cylindrical. It is therefore necessary to rigidify and integralize the space existing between the support structure having the same shape as the wingtip airfoil and the device, which we shall refer to as the rigid aerodynamic recess (28), all parts being manufactured to create minimum resistance. The assembly can rotate on its axis to left or right.

We know that the leading edges (1) on a wing airfoil are designed to conserve flow with minimum drag. The helicoidal slot located after the ovoid cylindrical inlet inevitably creates friction drag over its full length.

Drag reduction: in general terms, the smaller the surface exposed to relative wind (16) the lower the resistance. Taking K as the flow drag of a fluid over a form, the greater the resistance of the form the higher the value of K, hence the importance of wind tunnel testing to measure the gains achieved when an element is added to the original wingtip.

It is for this reason that the helicoidal cylindrical wingtip (25) must be perfectly cylindrical internally and externally. For this purpose, leading edges (1) and trailing edges (2) are envisaged with the helicoidal slot from inlet to outlet and to its full depth. The assembly comprises small tongue (18), the cylindrical ovoid inlet, the cylinder with its helicoidal slot, the junction slats of the helicoidal slot, integral at the rigid aerodynamic recess (28) and the supporting structure having the shape of the airfoil, with the complete assembly secured to the wingtip airfoil (22) in a fully aerodynamic configuration.

Vortex elimination: at an in-flight angle of attack at the wingtip, the vortex, corresponding to centripetal overpressure towards the upper surface, is formed from three pressure differentials:

1/The negative pressure flow is a downward air flow behind the trailing edge, created by acceleration due to the curvature of the upper surface (10) in relation to relative wind (16).

2/The overpressure flow is an upward air flow outside the wingspan of the undersurface (11) in relation to relative wind (16) towards upper surface (10).

3/The linear flow is not really a flow but a local pressure of relative wind (16) (as the aircraft moves forward in the air).

Inevitably these pressure differentials generate, just after the leading edge and from the undersurface (11), a helicoidal flow (26) over the full depth of the wingtip towards the trailing edge.

Due to its speed in relation to relative wind (16), the undersurface induced flow (26) becomes centripetal due to its overpressure, forming a helix (29) round this cylindrical form, penetrating to the path of the helicoidal slot, and dropping to a lower pressure (relative wind local pressure) as it continues towards the outlet.

When adjusting to obtain the best possible result for the airfoils used, the trailing edge (2) of the wingtip can be judiciously positioned in front of or behind the mid-thickness point of the helicoidal slot (4).

While it is now possible to retard this vortex by means of vertical prolongation of the wing (winglets for example), it has not yet been possible to attenuate or eliminate vortex. Vortex is a very powerful movement generated by major pressure differentials. The angle of attack of the wing increases the Cz factor, induced drag and wingtip vortex. As the angle of attack of the wing increases, so does the evacuation angle towards the wingtip also increase and vortex intensify: $Cxi(Cz^2/\pi\lambda).\frac{1}{2}\rho V^2 \cdot S$ of which $M.V^2/r$ (with r the radius of the device and M density), and its helicoidal angle (3) with relative wind (16).

If we now add the resistance of the device (speed of relative wind (16)) on the form of the wetted surface, this being the total surface in contact with the air): $KpS\ V^2$, its form allowing complete freedom of movement for this force in the direction in which it is entrained, the force will be trapped along the helicoidal slot and thus dissipate, at the same time increasing the Cz/cx (lift/drag) ratio.

According to the invention, the cylindrical wingtip device with helicoidal slot (25) is placed parallel to or on the airfoil chord from leading edge (1) at the commencement of small tongue (18) to helicoidal cylindrical inlet (in principle the point of maximum thickness of the wing (23)) and can extend beyond the trailing edge (2) by up to one third of wingtip chord depth.

According to the invention, the cylindrical wingtip device with helicoidal slot (25) is secured integrally with the wingtip. It is manufactured in a very high density, lightweight material, namely an aluminum alloy, titanium, fiberglass composite, Kevlar, carbon, or a higher strength material of the future.

According to the invention, the cylindrical wingtip device with helicoidal slot (25) can be free to move vertically parallel to the airfoil chord or not, according to the angle of attack adopted for the required or future flight data appropriate for the airplane concerned.

According to the invention, whether fixed or mobile and exposed in flight to different pressures, the cylindrical wingtip device with helicoidal slot (25) is subject to icing in the lower atmospheric layers caused by high humidity levels occurring as air temperature approaches dew point. The invention is characterized by the fact that the device, in order to neutralize frost and ice over its full thickness and depth, is equipped either with an electrical heater element, a pipe delivering hot air or liquid or a glycol release pipe, or other systems and products which could be employed in the future.

In short, the invention comprises:

Firstly, a wingtip device integrated with or articulated on said wingtip, the object of which is to increase lift, reduce drag and marginal swirl (vortex) and increase lift/drag ratio, having the appearance of a goose feather or small tongue (18) with an ovoid bevel cut (15) on the opposite side to the device attachment (24) and towards leading edge (1), the body of which represents a cylindrical or largely cylindrical cavity, largely spiral in form and/or largely spiral with a helicoidal or largely helicoidal slot, with the tip of said small tongue (18) always or nearly always having the same diameter (5), said device commencing at leading edge (1) on upper surface (10), then broadening to form a largely semi-cylindrical shape up to the largely cylindrical inlet approximately at the point of maximum wing thickness (23), at the commencement of an envelope surface part wound in seemingly helicoidal form (29) between approximately 180° and 360°; showing, on a largely helicoidal slot round axis (9) arranged largely along and parallel to wingtip airfoil chord (6), with this largely helicoidal slot at helix angle (3) and with thickness (4) that can be largely adapted to the airfoil and wing aspect-ratio, wing taper, wing sweep, speed and angle of attack in the medium considered, whether gaseous or liquid, in which the wing moves, and on the flow path along this largely helicoidal slot, the trailing edge (2) of the wingtip runs largely at the mid-point of thickness (4) of said largely helicoidal slot, in continuity, so that the depth of said device extends beyond trailing edge (2) of the wingtip to about one third of the depth of the chord, terminating in a largely annular form, said device making it possible to thus increase lift/drag ratio by decreasing resistance to the vortex effect induced by relative wind (16) penetrating frontally, and lateral induced flow (26) from overpressure (13) of undersurface (11), to direct and merge the flows in a cylindrical duct to the point of ejection; said device being applicable to airplanes, gliders, all types of blade, tractor and pusher propellers, wind-powered generator blades, also underwater devices for surface vessels or submarines using the three axes for their displacement, thus providing for the use of lower power drive systems, longer distance travel at higher speeds and with reduced energy consumption, or increased energy production in the case of wind-powered generators, and even transport of heavier loads and increased safety for transit, incoming and outgoing airport and airfield traffic.

Secondly, the device can be integral with the wing, initially set or articulated, controlled vertically parallel to airfoil chord (6) for a negative or positive setting on the axis of the wing aerodynamic center and/or rotating on its axis to left or right or move forwards or backwards along the airfoil chord, still integral with the wing according to flight data.

Thirdly, the device used in a reverse configuration (undersurface (11)/upper surface(10)) on high speed land vehicles or racing cars, secured to the wingtip of each wing providing a result inversely proportional to speed, the faster the vehicle travels the less drag it induces, and the greater its ground adhesion.

Fourthly, the configuration of the device is adapted to flow rate and speed, and the wing surfaces or aspect-ratio of the wing concerned.

Fifthly, the mechanical characteristics of the device are determined so as to be free from strain at all flow velocities. The materials used, such as aluminum alloy or titanium for aircraft, etc., must meet low mass criteria.

Sixthly, the largely helicoidal slot (19) of the device is equipped over its full length with junction slats (15) that can be profiled and run largely parallel to the cylindrical axis,
    their number being determined according to the stresses applied at the most heavily loaded points of the structure (21).

Seventhly, the device can be equipped with a de-icing system incorporating an electric heater element, or involving the projection of hot flows or using de-icing liquids.

Eighthly, the largely helicoidal slot of the device can subdivided into a number of slots where necessary.

What is claimed is:

1. A device for mounting on a wingtip, the device comprising:
    a generally cylindrical hollow body having a helicoidal slot in a side thereof and a side that is arranged and adapted to be attached to a wingtip; and
    said hollow body having an ovoid bevel cut extending toward a leading edge of said hollow body opposite the side of said hollow body that is arranged and adapted to be attached to a wingtip.

2. The device of claim 1, wherein said hollow body is arranged and adapted to be attached to a wingtip parallel to or on an airfoil chord of the wingtip.

3. The device of claim 1, wherein said hollow body is arranged and adapted to be attached to a wingtip so that a leading edge of said ovoid bevel cut is adjacent to a leading edge of the wingtip and an aft end of said ovoid bevel cut is adjacent to a maximum thickness of the wingtip.

4. The device of claim 1, wherein said hollow body is arranged and adapted to be attached to a wingtip so that a trailing edge of said hollow body extends beyond a trailing edge of the wingtip.

5. The device of claim 1, wherein said device is arranged and adapted to be immovably integral with the wingtip.

6. The device of claim 1, wherein said device is arranged and adapted to be movable relative to the wingtip.

7. The device of claim 1, wherein said helicoidal slot comprises slats spaced along a length of said helicoidal slot and that are aligned parallel to a longitudinal axis of said hollow body.

8. The device of claim 1, further comprising means for deicing said hollow body.

9. The device of claim 1, wherein said hollow body has a constant diameter.

10. The device of claim 1, wherein said helicoidal slot extends around at least 180° of said hollow body.

11. The device of claim 1, wherein said ovoid bevel cut defines a tongue that is arranged and adapted to follow a shape of the wingtip at a negative pressure surface thereof.

12. A wing comprising:

a wing body that produces lift;

a wingtip at an end of said wing body; and a generally cylindrical hollow body attached to said wingtip, said hollow body having a helical slot through a side thereof that extends around at least 180° of said hollow body, said hollow body having a forwardly extending tongue that tapers in width to a leading edge of said wingtip.

13. The wing of claim 12, wherein said hollow body is attached to said wingtip parallel to or on an airfoil chord of said wingtip.

14. The wing of claim 12, wherein said hollow body is attached to said wingtip with a leading edge of said tongue at the leading edge of said wingtip and an aft end of said tongue adjacent to a maximum thickness of said wingtip.

15. The wing of claim 14, wherein said hollow body is attached to said wingtip with a trailing edge of said hollow body extending beyond a trailing edge of said wingtip.

16. The wing of claim 12, wherein said hollow body is immovably integral with said wingtip.

17. The wing of claim 12, wherein said hollow body is movable relative to said wingtip.

18. The wing of claim 12, wherein said helical slot comprises slats spaced along a length of said helical slot and that are aligned parallel to a longitudinal axis of said hollow body.

19. The wing of claim 12, wherein said tongue conforms to a shape of said wingtip at a negative pressure surface of said wing body.

20. The wing of claim 12, wherein said wing body is adapted to produce lift in one of air and water.

* * * * *